March 29, 1932.  J. M. HAIT, JR  1,851,670
CONNECTING ROD AND COUPLING
Filed April 5, 1930  2 Sheets-Sheet 1
Fig.1
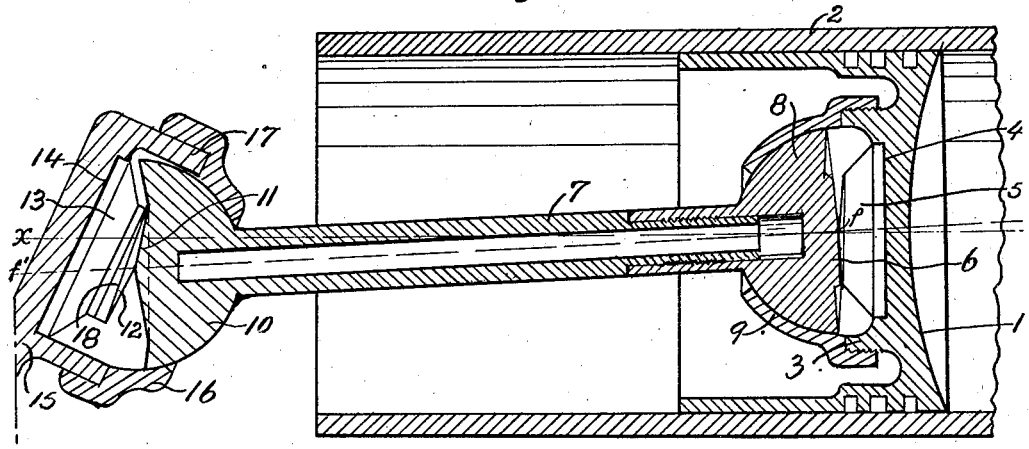
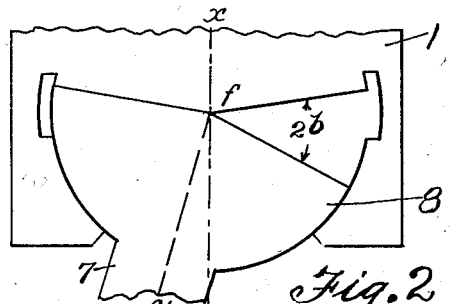
Fig.2
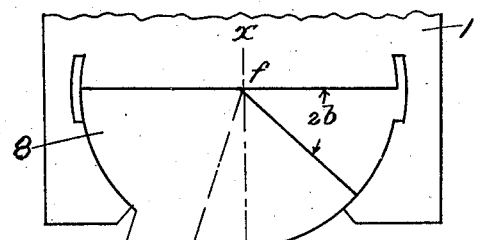
Fig.3
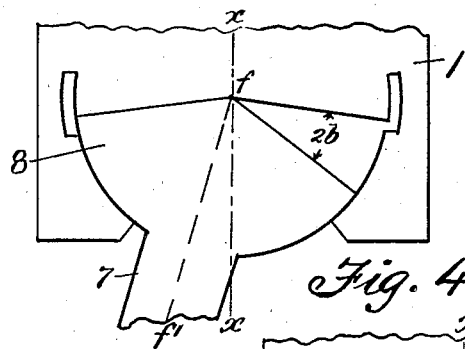
Fig.4
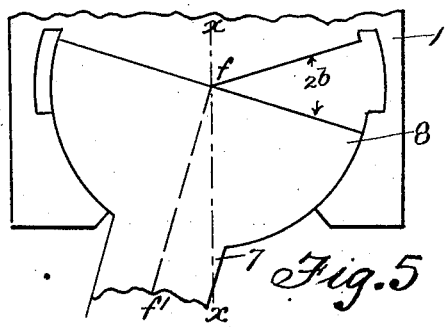
Fig.5
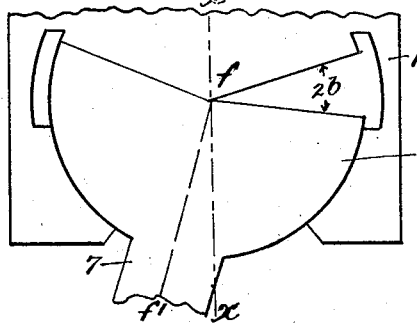
Fig.6
Inventor
James M. Hait Jr.
By Joseph Dugan
Attorney

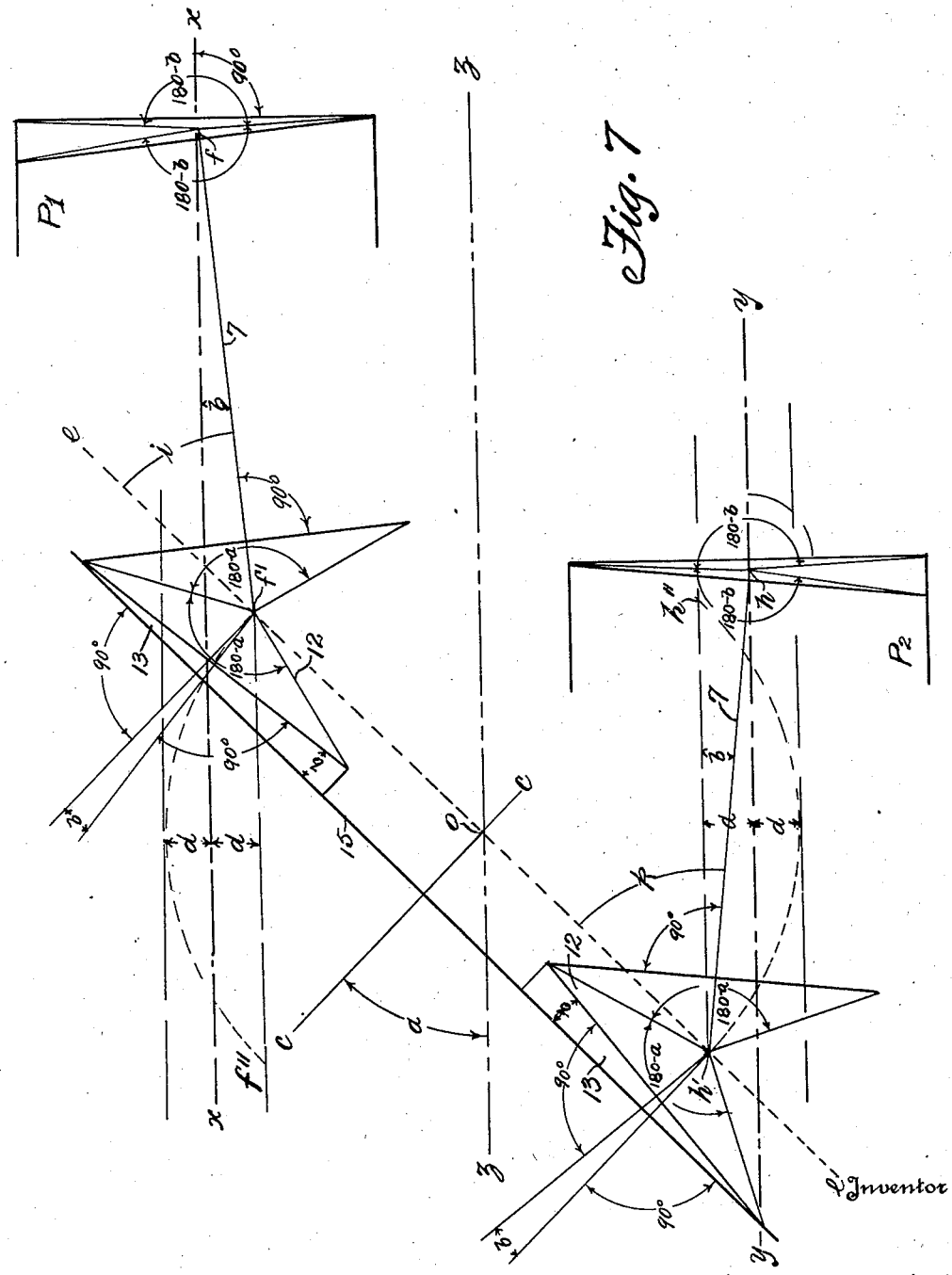

Patented Mar. 29, 1932

1,851,670

UNITED STATES PATENT OFFICE

JAMES M. HAIT, JR., OF BELL, CALIFORNIA, ASSIGNOR TO EDWARD MORRIS SMITH, OF LOS ANGELES, CALIFORNIA

CONNECTING ROD AND COUPLING

Application filed April 5, 1930. Serial No. 441,816.

This invention relates to connecting rods and couplings particularly adapted for use in engines of the barrel or wabble plate type, an example of which is fully disclosed in the U. S. patent to Davol, 1,656,884.

Engines of the type referred to encounter peculiar difficulties in the joints connecting the piston rod to the piston and wabble plate. This is mainly due to the peculiar compound rocking motion of the wabble plate during the reciprocation of the piston in its cylinder. Viewed end on the motion of any point on the plate is circular, and therefore necessitates a connection between one end of the rod and piston which permits the end connected to the wabble plate to swing in a circle. Heretofore, this movement has been taken care of by a universal joint, or by a ball-and-socket joint of the type disclosed in the above named patent.

High thrust pressures, such as occur in some kinds of pumps, and which always occur in gas and Diesel engines, cause difficulties in lubricating the aforesaid universal of ball-and-socket joints; and these difficulties are definitely known as the main cause of failure in this type of engine.

The main object, then, of the present invention is to eliminate this difficulty of lubrication between the coupling joints of the piston, wabble plate and connecting rod; and, also to eliminate, or greatly decrease, the loss of power due to friction between the elements of the prior couplings by eliminating the rubbing surfaces of such couplings. This is effected in the present invention by substituting coupling elements which receive the high thrust forces on perfect rolling contact surfaces.

Other objects of the invention will become apparent as the detailed description thereof proceeds.

In the drawings:

Fig. 1 is a central vertical section through a cylinder of a barrel engine, showing details of construction of the connecting rod and the couplings at each end thereof;

Figs. 2 to 6, inclusive, are diagrammatic fragmentary sketches of various modifications of the coupling joint; and Fig. 7 is a diagrammatic layout of a wabble plate and a pair of diametrically opposite pistons, illustrating the geometric relationship between the angles of the conical bearing elements and the angle of inclination of the wabble plate at each end of its stroke.

Referring, now, to Fig. 1, the piston 1 is shown as slidably mounted in the cylinder 2, assumed to be fixed so that its axis lies along the line $x$—$x$. The piston 1 is provided with an annular flange 3, concentric with the axis $x$—$x$ and forming a socket 4 adapted to receive one element 5 of a conical bearing, the other element 6 of which is detachably secured to one end of the connecting rod 7.

The end of the element 6 flares outwardly to form a hemispherical flange 8 adapted to form a seat for the correspondingly shaped cup 9 which is screwthreaded on to the annular flange 3 to secure the elements 5 and 6 in proper rolling contact with each other.

The other end of the connecting rod 7 has the hemispherical flange 10 formed thereon; and has its end shaped to form a conical bearing element 11 adapted to roll in contact with the cooperating element 12 formed on a bearing plate 13 which is seated in a socket 14 at the end of a wabble plate 15. A hemispherical cup 16 screwthreaded on to the annular flange 17 and engaging the flange 10, locks the connecting rod 7 to the wabble plate.

It will be apparent from the drawings that the element 12 has its base 18 tilted with respect to the wabble plate. This is to take care of and to eliminate the binding between the conical elements which would result from the angular movements of the plate toward and from the axis of the engine shaft. The reason for this tilting will be made clear from consideration of Fig. 7.

In Fig. 7, the line $z$—$z$ represents the crank shaft of the engine rotated by the wabble plate 15; and the lines $x$—$x$ and $y$—$y$, parallel to the line $z$—$z$, represent the axes of a pair of diametrically opposite cylinders of the engine. The line $e$—$e$, passing through the vertices of the diametrically opposite conical bearing plates 12, represents the plane of the wabble plate with respect to which the several parts are set off geometrically. The point $o$ where the lines $e$—$e$ and $z$—$z$ intersect is the rocking center of the wabble plate. The axis $c$—$c$ of the plate is arranged at the constant angle $a$ to the line $z$—$z$; and constitutes the generatrix of an imaginary cone formed by the rocking of said plate about its center $o$.

The piston P′ of the upper cylinder is shown at the inner end of its in-stroke; while the piston P2 of the lower cylinder is shown at the inner end of its out-stroke. The line $f$—$f'$, inclined at the angle $b$ to the line $x$—$x$, represents the axis of the piston rod in the upper cylinder; and the line $h$—$h'$, inclined at the same angle $b$ to the line $y$—$y$, represents the axis of the piston rod in the lower piston.

In order that true rolling contact may be obtained at both ends of the connecting rods, the following conditions must be substantially adhered to, although substantial deviations of a conjugate nature may be commercially allowable: (1) The points $f'$, $o$, and $h'$ must lie in the same plane; (2) the points $f'$ and $h'$ must pass as far outside their respective axes $x$—$x$ and $y$—$y$ as they pass inside the said axes at both ends of their strokes; and (3) the wabble plate 15 must be so restrained that it does not rotate about its own axis $c$—$c$.

In Fig. 7, the reference characters $f''$ and $h''$ indicate the positions of the wabble plate ends of the rods, or rather the ends of the axes of said rods, at the ends of the strokes opposite to those shown in the drawings. The dotted arcs give rough indications of the paths through which the points $f'$ and $h'$ travel through the equal distances $d$ on opposite sides of the axes $x$—$x$ and $y$—$y$.

If the above enumerated conditions be adhered to, the points $f'$ and $h'$, when viewed end on along the axes $x$—$x$ and $y$—$y$, will describe true circular paths, and the angle $b$ will remain constant during these movements; and the pressure loads at the piston ends of the connecting rods may be transmitted by two rolling contact cones, each of which has its vertex angle equal to 180°—$b$.

Frictionless rolling contact of the piston load to the connecting rod is thus secured, and a minimum of lubrication is required. These conic rolling surfaces may be retained in correct relative operative positions by any suitable means; but the spherical form of rod retaining bearing, shown in Fig. 1, is preferred, since it is normally intermittently and very lightly loaded and its lubrication presents no difficulty.

In order to secure similar rolling cone action at the joint between the connecting rod and the wabble plate, certain modifications are required. It is evident from Fig. 7 that the angle $i$ between the connecting rod axis $f$—$f'$ and the line $e$—$e$, representing the plane of the wabble plate 15, is equal to 90°—$a$—$b$; while, the angle $k$ between the connecting rod axis $h$—$h'$ is equal to 90°—($a$—$b$), the total difference being $2b$. To compensate for this difference, it is necessary to tilt the axis of one or both of the cones (included in the joints at $f'$ and $h'$) about the line $e$—$e$.

Since the connecting rods should, ordinarily, be free to rotate about their own axes, it is preferable to tilt the cone bearings in the wabble plate. Accordingly, the cone members 12 in the wabble plate 15 are tilted so that their cone axes are tilted from the normal toward each other about the vertices of the cones, and coplanar with the axis $c$—$c$, through an angle equal to the angle $b$ in each case. The vertex angles of the cones at the ends of the connecting rods and on the cooperating members on the wabble plate may then be made equal to each other and to 180°—$a$.

It is immaterial how this tilt is effected mechanically in the conical bearing members 12. The essential thing is that the base of the cone be tilted so that its normal is tilted through the angle $b$ and lies in a plane perpendicular to the wabble plate and passing through the center $o$. Any suitable mechanical expedient may be used for locking the members 12 in the necessary inclined positions in the sockets on the plate 15.

The details of the wabble type engine to which this invention is peculiarly applicable are not illustrated herein, since they form no part of the present invention. They are clearly shown in the Davol patent above referred to, and in my copending application for internal combustion engines Serial No. 422,105 filed January 20, 1930.

It must be understood that the form of the joints may be varied without in any manner departing from the principle of the invention. Several modifications are illustrated diagrammatically in Figs. 2 to 6, inclusive of the drawings. The form shown diagrammatically in Fig. 2, which is the same in principle as that shown in Fig. 1, is the preferred form, because the conical surfaces of the cooperating elements are equal to each other; and the cone element at the end of the rod 7 therefore rolls on the cooperating element 5 without slip or rotation of the rod 7 about its axis $f$—$f'$.

In the forms shown in Figs. 3 and 5, only one of the bearing elements is formed as a cone. Obviously, these forms will involve rotation of the connecting rod about its axis, since the contact areas are different. This applies also to the forms shown in Figs. 4 and 6, in which one of the elements is inverted.

What I claim as my invention is:

1. A piston, a connecting rod therefor, cooperating conical thrust bearing members on said piston and rod and having a common vertex, a hemispherical flange projecting laterally from said rod and having its center at said vertex, and a hemispherical cap detachably connected to said piston and engaging said flange to hold the rod and piston with the conical surfaces of their bearing members constantly in line contact with each other.

2. In a device of the character described, two members having axes intersecting each other; cooperating oppositely disposed conical bearings, one on each member and having its axis coincident with the axis of the member carrying it, said bearings having a common vertex at their axial intersection; and cooperating spherical elements, having a common center at said vertex, for securing said members to each other with the axis of one rotatable at a constant angle around the axis of the other and with the conical bearing surfaces of said bearings in line contact with each other.

3. In a device of the character described, two members having intersecting axes; a joint connecting the said two members to each other and comprising two cooperating bearing elements having conical contact surfaces in constantly rolling contact with each other; and spherical means for holding said members with their said elements in rolling contact with each other; the center of said spherical means and the common vertex of said surfaces lying at the intersection of said axes.

In testimony whereof, I have signed my name to this specification.

JAMES M. HAIT, Jr.